United States Patent
Potel et al.

(10) Patent No.: US 9,309,882 B2
(45) Date of Patent: Apr. 12, 2016

(54) METHOD OF DETERMINING WHETHER TO REPLACE A HIGH PRESSURE PUMP IN A HYDRAULIC REGULATION SYSTEM OF A TURBOMACHINE

(75) Inventors: Nicolas Potel, Maisons Alfort (FR); Nicolas Gomes, Melun (FR)

(73) Assignee: SNECMA, Paris (FR)

(*) Notice: Subject to any disclaimer, the term of this patent is extended or adjusted under 35 U.S.C. 154(b) by 223 days.

(21) Appl. No.: 14/344,777

(22) PCT Filed: Aug. 13, 2012

(86) PCT No.: PCT/FR2012/051888
§ 371 (c)(1),
(2), (4) Date: Jul. 29, 2014

(87) PCT Pub. No.: WO2013/038085
PCT Pub. Date: Mar. 21, 2013

(65) Prior Publication Data
US 2014/0373611 A1 Dec. 25, 2014

(30) Foreign Application Priority Data
Sep. 13, 2011 (FR) ...................... 11 58133

(51) Int. Cl.
| | |
|---|---|
| F04B 51/00 | (2006.01) |
| F04D 29/56 | (2006.01) |
| G01D 5/22 | (2006.01) |
| G01M 15/14 | (2006.01) |
| F04D 27/00 | (2006.01) |

(52) U.S. Cl.
CPC .............. *F04B 51/00* (2013.01); *F04D 27/001* (2013.01); *F04D 29/563* (2013.01); *G01D 5/2291* (2013.01); *G01M 15/14* (2013.01)

(58) Field of Classification Search
USPC ....................................... 73/112.03
See application file for complete search history.

(56) References Cited

U.S. PATENT DOCUMENTS

2001/0052338 A1  12/2001  Yates
2007/0107435 A1   5/2007  Bickley
(Continued)

FOREIGN PATENT DOCUMENTS

EP  1 138 933 A2  10/2001
EP  1 785 348 A2   5/2007
(Continued)

OTHER PUBLICATIONS

International Search Report issued Dec. 6, 2013, in PCT/FR12/051888 filed Aug. 13, 2012.

*Primary Examiner* — Laura Martin
*Assistant Examiner* — Jean Morello
(74) *Attorney, Agent, or Firm* — Oblon, McClelland, Maier & Neustadt, L.L.P.

(57) ABSTRACT

A method tracking positive displacement efficiency of a high pressure positive displacement pump in a hydraulic regulator system of a turbomachine delivering a flow rate based on an engine speed of the turbomachine, the flow rate delivered to an actuator actuating variable geometry vanes of the turbomachine and to a bypass valve feeding engines of the turbomachine, the method including: starting engines of the turbomachine at a low engine speed, the valve being closed; using a computer to order a movement of the actuator; progressively increasing the engine speed until the flow rate reaches a predetermined value sufficient for opening the valve; storing in the computer a position of the actuator and the engine speed corresponding to opening of the valve; repeating the preceding operations at successive instants during a lifetime of the engines; and replacing the high pressure positive displacement pump when the engine speed exceeds a predetermined value.

3 Claims, 3 Drawing Sheets

(56) References Cited

U.S. PATENT DOCUMENTS

2007/0261384 A1 11/2007 Flint
2010/0257867 A1* 10/2010 Aurousseau ............ F02C 7/236
60/779

FOREIGN PATENT DOCUMENTS

| EP | 1 798 400 A2 | 6/2007 |
| FR | 2 923 871 A1 | 5/2009 |
| FR | 2 942 001 A1 | 8/2010 |

* cited by examiner

METHOD OF DETERMINING WHETHER TO REPLACE A HIGH PRESSURE PUMP IN A HYDRAULIC REGULATION SYSTEM OF A TURBOMACHINE

BACKGROUND OF THE INVENTION

The present invention relates to the general field of gas turbines and it relates more particularly to a method for monitoring the positive displacement efficiency of the high pressure (HP) pump of a hydraulic regulation system of a turbomachine without having recourse to using a specific sensor or system.

The field of application of the invention is that of gas turbines for engines for airplanes or helicopters that generally include a high pressure positive displacement pump for producing hydraulic energy, for feeding fuel to the engines, and for lubricating various accessories of the engine.

In known manner (e.g. from FR 2 923 871), the efficiency of the HP pump is monitored by the high pressure shutoff valve (HPSOV) that serves to pressurize the engines and that, given knowledge of the level of leakage in the hydraulic system, is capable of determining the level of leakage in the HP pump by subtracting the leaks due to other components in the system such as actuators, servo-valves, and various other intermediate valves.

Nevertheless, although that solution is entirely satisfactory for evaluating overall leakage in the system, it does not make it possible to track accurately the efficiency of the HP pump that varies as a result of degradation over time in the various components of the system and because the hydraulic control of the variable geometry vanes is not shut off at low speed, which raises a problem when it is necessary to evaluate the capacity of the system for enabling engines to be restarted in flight or when it is appropriate to plan for replacing the HP pump, without such replacement giving rise to any major operating impact.

OBJECT AND SUMMARY OF THE INVENTION

A main object of the present invention is thus to propose a method of tracking the positive displacement efficiency of the HP pump of a hydraulic regulation system of a turbomachine that enables such drawbacks to be mitigated.

This object is achieved by a method of tracking the positive displacement efficiency of a high pressure pump in a hydraulic regulator system of a turbomachine having a high pressure positive displacement pump delivering a flow rate Q that is a function of an engine speed N of said turbomachine as defined by a control computer, the flow rate Q being delivered to an actuator for actuating variable geometry vanes of said turbomachine and to a bypass valve arranged in a feed pipe for feeding fuel to the engines of said turbomachine, the method being characterized in that it comprises the following steps:

starting the engines of said turbomachine at a low engine speed N0, said valve being closed;

using said computer to order a movement of said actuator;

progressively increasing said engine speed N until said flow rate Q reaches a predetermined value Q0 that is sufficient for opening said valve;

storing in said computer firstly the position of said actuator and secondly the engine speed N corresponding to the opening of said valve;

repeating the preceding steps at successive instants t1, t2, tn during the lifetime of said engines of the turbomachine; and replacing said high pressure positive displacement pump when said engine speed N exceeds a predetermined value $N_{limit}$.

Thus, by eliminating any intermediary between the HP pump and the monitored valve, it is possible to track accurately the degradation in the efficiency of the HP pump and thus also to monitor the capacity of the engines of the turbomachine to restart in flight.

Preferably, said position of the actuator is measured by an LVDT sensor of said actuator and said predetermined value Q0 for the flow rate corresponds to a rated threshold of a spring of said valve.

BRIEF DESCRIPTION OF THE DRAWINGS

Other characteristics and advantages of the present invention appear from the following description made with reference to the accompanying drawings, which illustrate an implementation having no limiting character. In the figures:

FIG. 1 is a simplified diagram of a hydraulic system for a turbomachine, the bypass valve being shown closed;

FIG. 2 is a simplified diagram of a hydraulic system for a turbomachine, the bypass valve being shown open;

FIG. 3 plots two curves illustrating respectively the position of the actuator and the engine speed as a function of time while starting the engine; and FIG. 4 plots a curve showing conditions for opening the bypass valve as a function of time.

DETAILED DESCRIPTION OF AN EMBODIMENT

FIGS. 1 and 2 are simplified diagrams of a hydraulic system for a turbomachine with a variable bypass valve (VBV) shown in two opposite positions.

Conventionally, the high pressure positive displacement pump (HP pump) 10 is followed immediately downstream by a bypass valve 12 that serves to allow pressure to rise in the hydraulic system. This valve opens when the flow rate that is applied thereto makes it possible to reach the accurately known rated threshold of its spring 12A. It serves firstly to move an actuator 14 that moves variable pitch vanes (not shown) via an associated servo-valve 16 connected by an upstream pipe 18 to the HP pump and by a downstream pipe 20 to the bypass valve 12, and also to feed fuel to the engines (not shown) by putting them into communication with the HP pump successively via a fuel metering valve (FMV) 22 and a high pressure cutoff valve (HPSOV) 24 connected in an engine feed pipe 26. A computer 28 connected to the various components of the hydraulic system provides general control on the basis of data such as the desired engine speed N, or the movement of the piston 14A of the actuator 14 as measured by a linear variable displacement transducer (LVDT) 14B. Naturally, the hydraulic circuit has other conventional components (e.g. filters, valves, heat exchangers, . . . ) that nevertheless do not need to be described in order to understand the invention and that are therefore not shown. However, it should be observed that there is a pipe 30 for recirculating the flow from the bypass valve that is connected to the downstream pipe 20 through the bypass valve 12.

The above system operates as follows. The positive displacement HP pump is boosted by a low pressure (LP) pump (not shown) situated upstream therefrom, the HP pump 10 delivering a flow rate that is a function of the engine speed N to the actuator 14 (via the servo-valve 16) and to the bypass valve 12. There is naturally some leakage through the HP pump and such leaks increase with increasing degradation of the pump.

Figure 1:
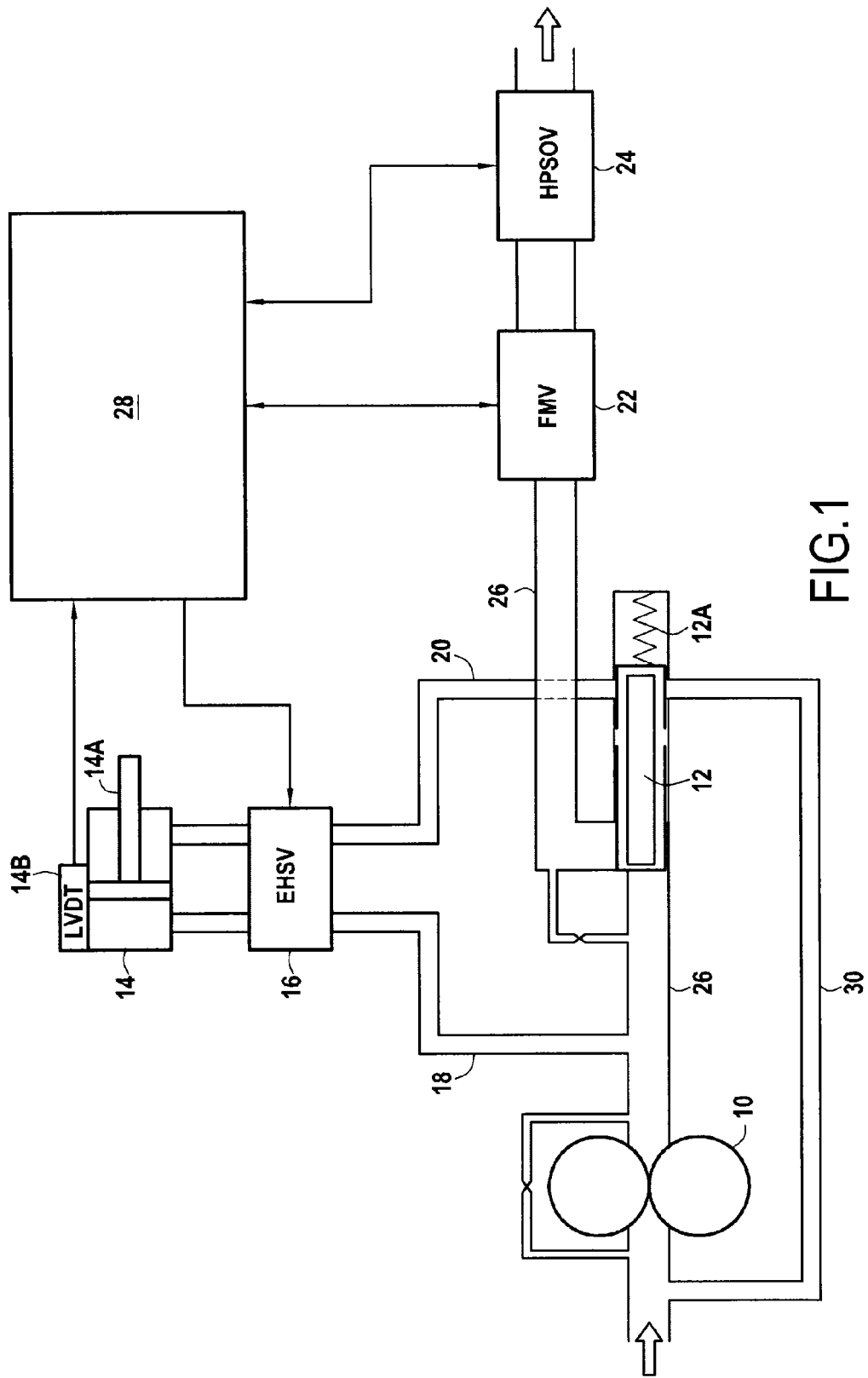

When the bypass valve 12 is in a closed state (FIG. 1), the pipe 20 between the outlet of the servo-valve 16 and the bypass valve 12 is obstructed by the bypass valve. The pressure difference across the terminals of the actuator 14 is zero and the two chambers of the actuator are at identical pressures, so the piston 14A is held stationary, as are the variable pitch vanes that it actuates.

Figure 2:
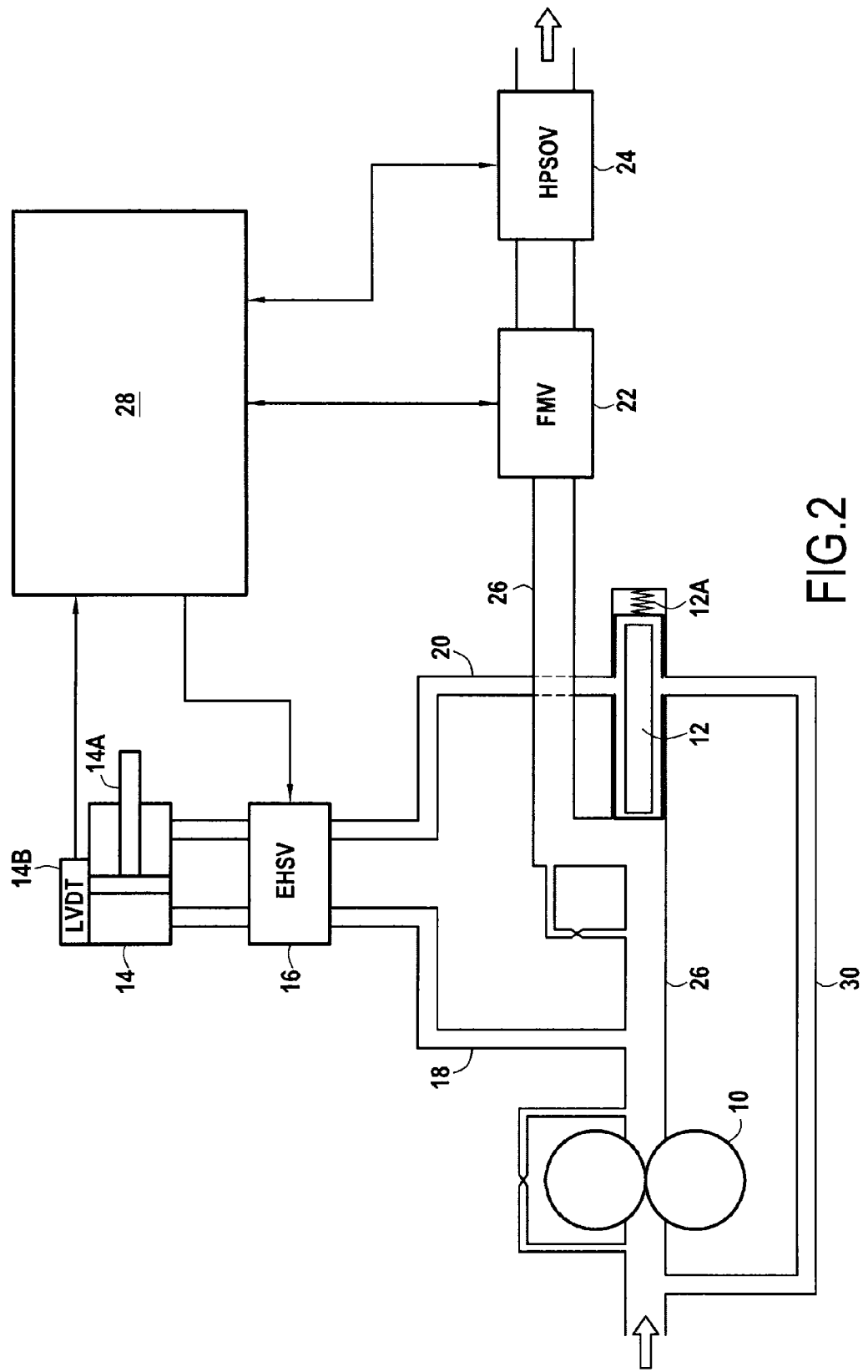
Figure 3:
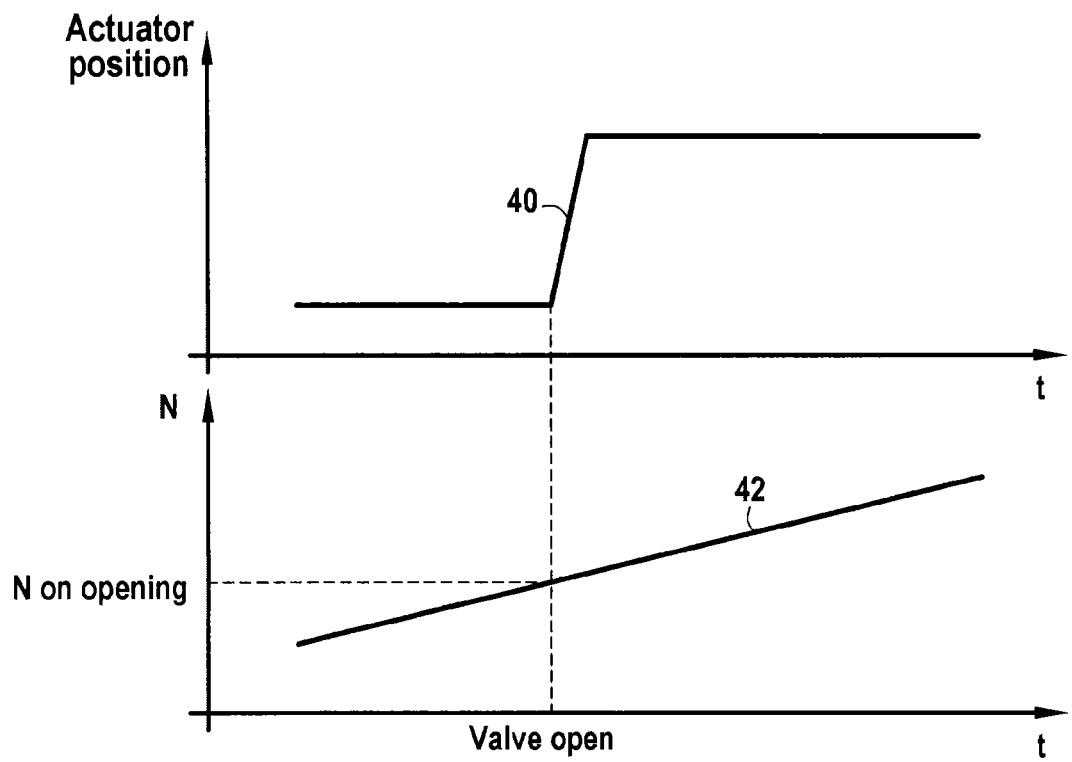

As soon as the pressure at the bypass valve 12 exceeds the rated threshold of the spring 12A, i.e. when the flow rate that it sees becomes high enough, it switches to a fully open state (FIG. 2) and the pipe 20 between the outlet of the servo-valve 16 and the bypass valve 12 is no longer obstructed. The fuel is then at low pressure and the piston 14A is subjected to a pressure difference (a non-zero pressure difference) that causes it to move, as shown by curve 40 in FIG. 3. Since the actuator has the LVDT 14B, it is then possible by means of the computer 28 to detect accurately the instant at which the piston moves, which instant thus corresponds to the opening of the bypass valve, and to observe the associated engine speed N (see curve 42).

According to the invention, in order to track the positive displacement efficiency of the HP pump 10 of the hydraulic regulation system of a turbomachine, the inventors started from the observation that if the HP pump becomes degraded over time, the above-mentioned observed engine speeds N will also be different, and they have developed an innovative method that relies on the following steps.

Initially, the engine is running on the ground at a low speed N0 and the bypass valve 12 is closed. The computer 28 then begins by ordering the actuator 14 to move. However, since the bypass valve is closed, the actuator cannot respond to that order and it therefore remains stationary. In parallel with that order, the engine speed N increases progressively. So long as the flow rate delivered to the bypass valve 12 is not sufficient, the bypass valve remains closed and the actuator 14 does not move. Once the flow rate is sufficient (determined value Q0 corresponding to the rated threshold of the spring 12A), the bypass valve 12 opens and the actuator 14 begins to move. The engine speed N corresponding to the opening of the bypass valve 12 and thus to the movement of the actuator is observed by means of the LVDT 14B of the actuator to which the computer 28 is connected, and this speed is stored in the computer.

Figure 4:
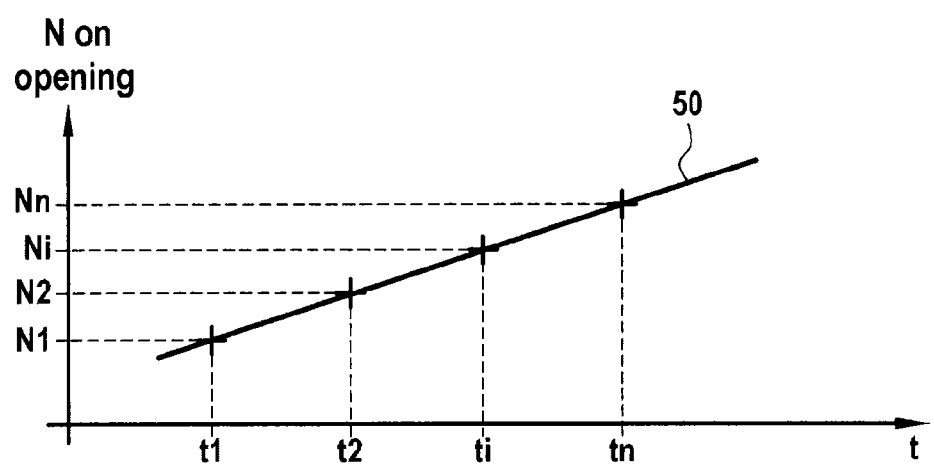

By repeating the above steps at successive instants t1, t2, . . . , tn over the lifetime of the engines, a curve 50 is obtained as shown in FIG. 4 that makes it possible to track accurately degradation in the efficiency of the HP pump 10, and by defining a limit value $N_{limit}$ that is not to be exceeded for engine speed, it is possible to decide when action needs to be undertaken, in particular concerning replacement of the HP pump.

The invention claimed is:

1. A method of determing when to replace a high pressure pump in a hydraulic regulator system of a turbomachine including a high pressure positive displacement pump delivering a flow rate that is a function of an engine speed of the turbomachine as defined by a control computer, the flow rate being delivered to an actuator for actuating variable geometry vanes of the turbomachine and to a bypass valve arranged in a feed pipe for feeding fuel to engines of the turbomachine, the method comprising:

starting the engines of the turbomachine at a low engine speed, the valve being closed;

using the control computer to order a movement of the actuator;

progressively increasing the engine speed until the flow rate reaches a predetermined value that is sufficient for opening the valve;

storing in the control computer a position of the actuator and the engine speed corresponding to the opening of the valve;

repeating the preceding operations at successive instants during a lifetime of the engines of the turbomachine; and replacing the high pressure positive displacement pump when the engine speed exceeds a predetermined value.

2. The method according to claim 1, wherein the position of the actuator is measured by an LVDT sensor of the actuator.

3. The method according to claim 1, wherein the predetermined value for the flow rate corresponds to a rated threshold of a spring of the valve.

* * * * *